United States Patent [19]

Ezaki

[11] 4,093,254
[45] June 6, 1978

[54] PROTECTIVE FRAME STRUCTURE FOR A MOTOR VEHICLE FUEL TANK

[75] Inventor: Toshi Ezaki, Toyota, Japan

[73] Assignee: Toyoto Jidosha Kogyo K. K., Toyota, Japan

[21] Appl. No.: 734,978

[22] Filed: Oct. 22, 1976

[30] Foreign Application Priority Data

Aug. 6, 1976 Japan .................. 51-105008

[51] Int. Cl.² ................................................ B60R 5/04
[52] U.S. Cl. ................... 280/783; 188/1 C; 280/5 A
[58] Field of Search ......... 296/24 R; 280/5 A, 106 R; 188/1 C

[56] References Cited

U.S. PATENT DOCUMENTS

| | | | |
|---|---|---|---|
| 2,136,122 | 11/1938 | Almdale | 280/106 R |
| 2,808,892 | 10/1957 | Walker | 280/5 A |
| 3,661,419 | 5/1972 | Mitamura et al. | 280/5 A |
| 3,795,410 | 3/1974 | Huber | 280/106 R |

*Primary Examiner*—Richard A. Bertsch
*Attorney, Agent, or Firm*—Koda and Androlia

[57] ABSTRACT

A structure for protecting a fuel tank which is mounted at the rear of and above the frame of a motor vehicle and between two parallel frame members extending along the side of the fuel tank. The protective structure includes reinforcing members coupled to the frame members adjacent the fuel tank such that the frame members along both sides of the fuel tank are reinforced and the frame members before and behind the fuel tank are not reinforced thereby allowing collision forces to be absorbed by the nonreinforced sections of the frame members.

12 Claims, 12 Drawing Figures

PROTECTIVE FRAME STRUCTURE FOR A MOTOR VEHICLE FUEL TANK

BACKGROUND OF THE INVENTION

1. Field of Invention

This invention relates to safety devices for motor vehicles and more particularly for means for protecting a fuel tank during a collision.

2. Description of the Prior Art

In the event of an accident, the motor vehicle fuel tank is liable to suffer damage thereby resulting in fuel leakage which could lead to a fire. To prevent this, means such as those illustrated in FIGS. 1 and 2 have been employed. In FIGS. 1 and 2, fuel tank 1 has a pair of frame members 2 extending along the sides thereof. In front of the fuel tank 1, frame members 2 are provided with kicked up portions 3. Behind fuel tank 1 is provided a cross member 5 between the frame members 2 and in front of fuel tank 1 and before kicked up portions 3 is provided a cross member 4. Between cross members 4 and 5, fuel tank mounting brackets 6 are fastened to the frames 2 by means of fastening nuts 7 and bolts 8. Forward of kick-up portions 3, frame members 2 are reinforced by inner metal channels 9 coupled to the inside of frame member 2.

In the event of a collision from the rear with the above described frame structure, the entire frame structure supporting the tank receives the collision energy which deforms the frame structure, as shown in FIG. 3, resulting in deformation extending to the fuel tank supported by the frame. As a consequence, the fuel tank is frequently ruptured and a leakage of fuel can result.

SUMMARY OF THE INVENTION

Accordingly, it is the general object of the present invention to provide a protective structure for a fuel tank which absorbs the energy of collision without deforming that portion of the frame adjacent the fuel tank.

In keeping with the principles of the present invention, the objects are accomplished by a unique protective structure for protecting a fuel tank which is mounted at the rear of a motor vehicle and between two parallel frame members extending along the side of the fuel tank. The structure includes reinforcing members coupled to the frame members for at least the length of the fuel tank. In this way, the frame is composed of a reinforced section extending along the length of the tank and nonreinforced sections before and behind the tank so that the nonreinforced sections absorb the energy of impact without deforming the fuel tank.

BRIEF DESCRIPTION OF THE DRAWINGS

The above mentioned and other features and objects of the present invention will become more apparent by reference to the following description taken in conjunction with the accompanying drawings, wherein like referenced numerals denote like elements, and in which.

DETAILED DESCRIPTION OF THE INVENTION

Figure 1:
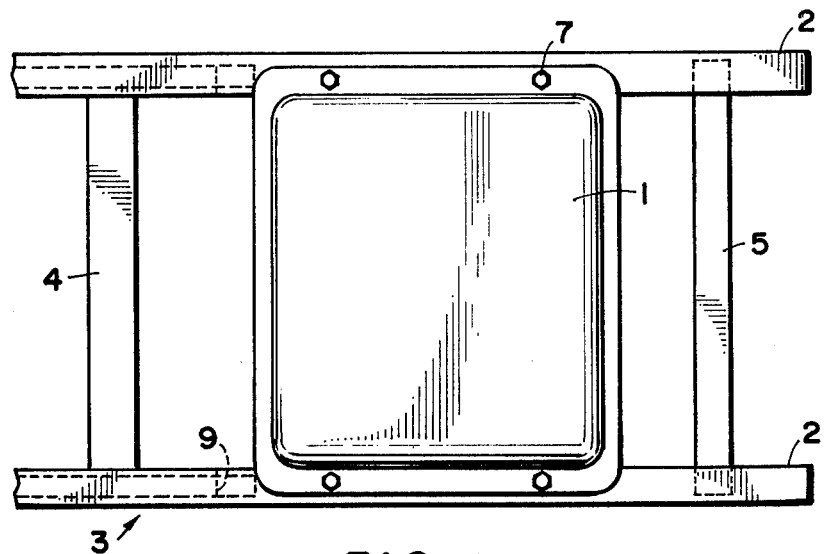
FIG. 1 is a top view illustrating a fuel tank protective frame structure for a motor vehicle of the prior art.
Figure 2:
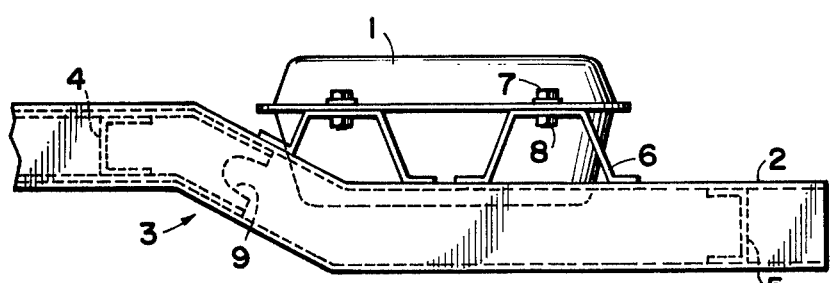
FIG. 2 is a side view of the prior art structure of FIG. 1.
Figure 3:
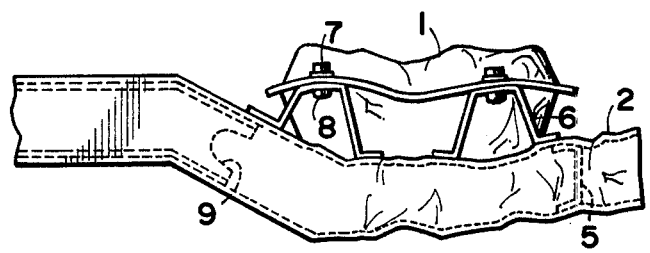
FIG. 3 is a side view of the structure of FIG. 1 illustrating the results of a rear-end collision.
Figure 4:
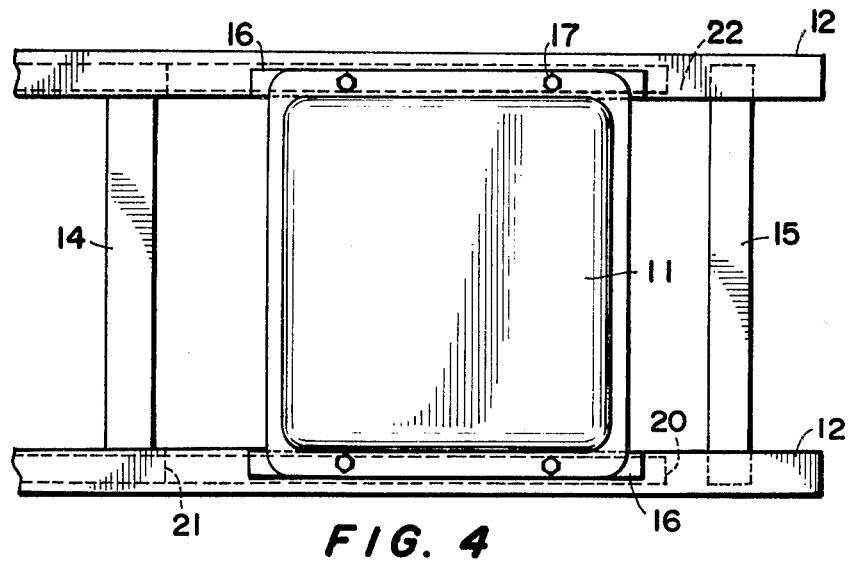
FIG. 4 is a top view of a protective structure for a motor vehicle fuel tank in accordance with the teachings of the present invention.
Figure 5:
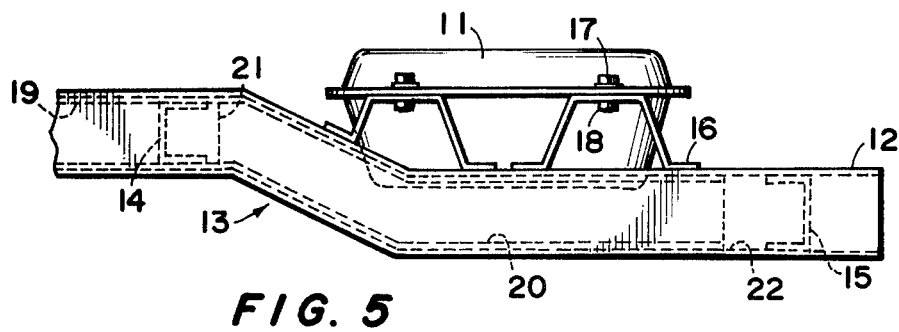
FIG. 5 is a side view of the embodiment of FIG. 4.

Referring to FIG. 4, shown therein is a top view of a fuel tank protective frame structure in accordance with the teachings of the present invention and FIG. 5 is a side view of the embodiment of FIG. 4.

In FIGS. 4 and 5, the fuel tank 11 is supported on the frame 12 by fuel tank mounting brackets 16 and fastened to the mounting brackets by nuts and bolts 17 and 18. An inner channel 20 is coupled to the interior of frame 12 along the length of the fuel tank 11 and reinforces the frame 12 from the rear of inner channel 19 through kick-up portion 13 to a position near the front of cross-member 15. Inner channel 19 is provided on the inside of frame 12 forward of kick-up portion 13.

Figure 6:
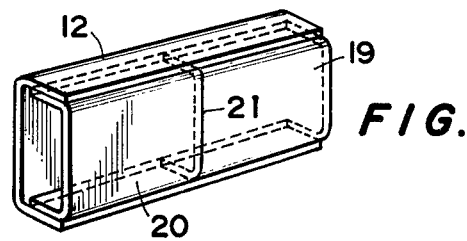
FIG. 6 is a side view of the principal parts of the embodiment of FIG. 4 illustrating the fit of the inner channels.

As shown in FIG. 6, the inner channel 20 is fitted and welded into frame 12 forming a closed cross-section with the frame which has a cross-section resembling a square. The anterior portion of inner channel 20 is provided so that it does not contact the edge of inner channel 19 within kick-up portion 13. Furthermore, the posterior edge of inner channel 20 is provided so that there is a suitable gap between it and the rear cross-member 15. This portion 22 between the end of inner channel 20 and rear cross-member 15 is designed so as to be not reinforced.

Figure 7:
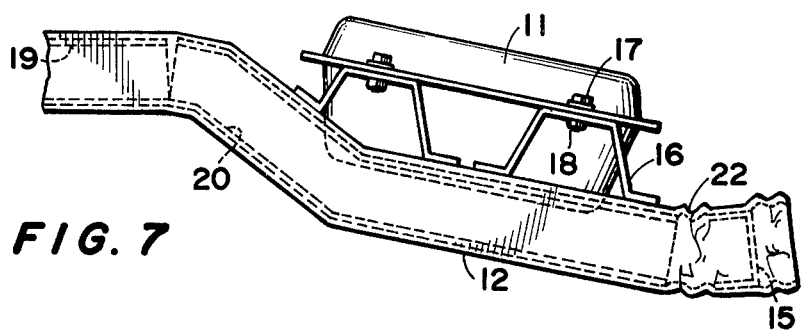
FIG. 7 is a side view of a protective structure in accordance with the teachings of the present invention showing the results of a rear-end collision.

As shown in FIG. 7, in the event of a rear end collision occurring to a motor vehicle with a protective frame structure of the above composition, the impact energy would concentrate at the posterior nonreinforced section 22 as well as the point 21. As shown in FIG. 7, the posterior nonreinforced section 22 would be deformed and the point 21 would bend and open during deformation. Accordingly, the portions of the frame 12 supporting the fuel tank 11 would be reinforced by inner channel 20 so that deformation arising due to impact energy would be prevented or moderated thereby leading to a prevention of rupture of the fuel tank 11.

Figure 8:
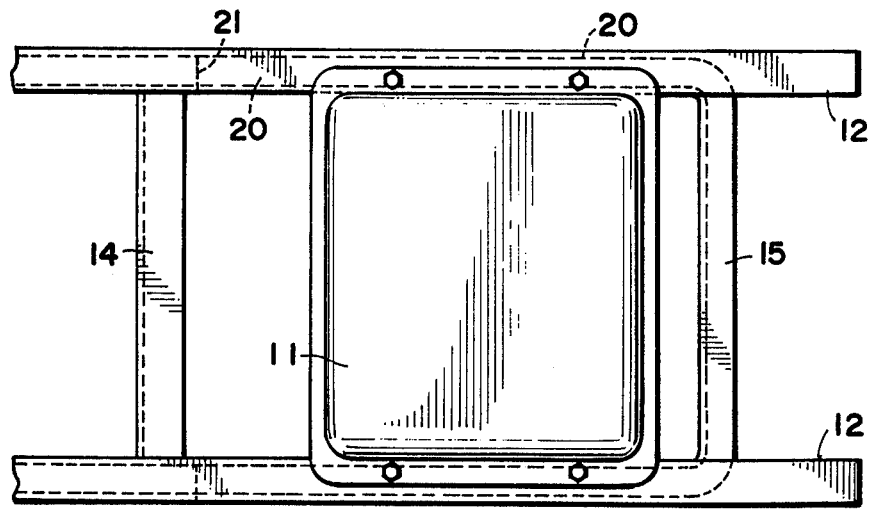
FIG. 8 is a top view of a second embodiment of the present invention.
Figure 9:
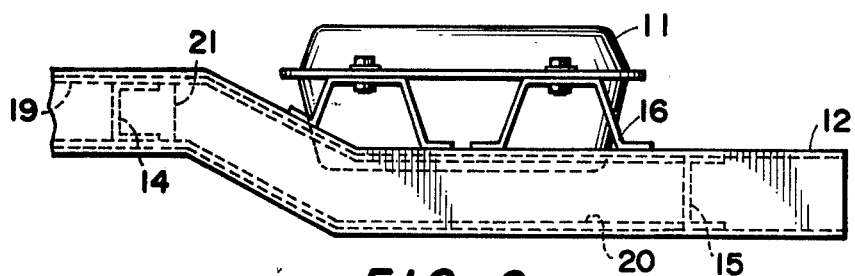
FIG. 9 is a side view of the embodiment of FIG. 8.

FIGS. 8 and 9 illustrate a second example of a protective structure in accordance with the teachings of the present invention. In this second embodiment, the inner channel 20 is united with the posterior cross-member 15 so as to form a strengthened area surrounding the fuel tank 11. Since this embodiment is similar to that previously described, like elements will be given like referenced numerals and a description of their interconnection in operation will be omitted.

Figure 10:
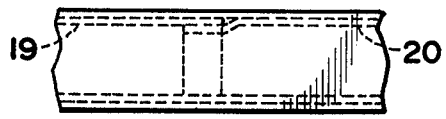
FIG. 10 is a partial side view showing a portion of the frame structure at the side where the inner channels meet.
Figure 11:
FIG. 11 is a partial side view showing a portion of the frame structure at the site where the inner channels meet.

In this embodiment, the impact energy concentrates at the point 21 where the two channels meet in front of the fuel tank and also at the area behind the rear cross-member 15. Furthermore, at the point 21, the inner channel 20 and the inner channel 19 forward of the kick-up portion 13 are adjoined at right angles to the axial direction of the inner channels. As shown in FIGS. 10 and 11, the edges of the inner channels 19 and 20 may be fitted together. In this case, the two inner channels 19 and 20 may be fitted together but they are not fastened together. In addition, a suitable space may be established between the edges of inner channels 19 and 20.

Figure 12:
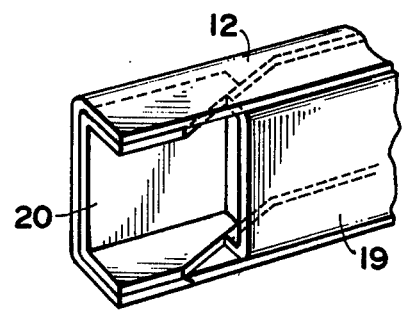
FIG. 12 is an enlarged inner view showing a part of the frame structure at the portion where the inner channels meet.

In this embodiment, a closed cross-section is formed by the inner channel 20 together with frame 12. However, as shown in FIG. 12, the inner channel 20 may be superimposed onto the frame 12 and fastened thereto, thereby forming an open cross-section. Furthermore, for the interconnection shown in FIG. 12, the edges of inner channels 19 and 20 may be angular to the axis of the inner channels so that they may overlap at the adjoining point 21.

In practice, the inner channels 19 and 20 may be metal channels such as channel steel or the like.

The above described device comprises a pair of frames which extend along the length of a motor vehicle, such as an automobile, forming a protective frame structure for the fuel tank situated at the rear of the motor vehicle. The frame must extend at least the length of the fuel tank and is composed of a reinforced section with nonreinforced sections before and behind the fuel tank so that when the automobile is struck from behind, the impact energy would be concentrated at the nonreinforced sections and absorbed there. Since this structure would prevent or moderate the deformation resulting from a collision from reaching the fuel tank, the effect of prevention of fuel leakage from a ruptured tank would be achieved.

In all cases, it is understood that the above described embodiments are merely illustrative of but a small number of the many possible specific embodiments which can represent applications of the principles of the present invention. Numerous and varied other arrangements can be readily devised in accordance with these principles by those skilled in the art without departing from the spirit and scope of the invention.

I claim:

1. A structure for protecting a fuel tank which is mounted at the rear of a motor vehicle and between two frame members of said motor vehicle which extend along and beyond the sides of said fuel tank, said structure comprising reinforcing members coupled to said frame members, said reinforcing members extending at least the length of said tank whereby said frame members are provided with a reinforced section adjacent at least the length of said fuel tank and nonreinforced sections before and behind said fuel tank.

2. A structure for protecting a fuel tank according to claim 1 wherein at least one of said nonreinforced sections comprises that portion of said frame members between the rear of said gas tank and the front of a cross-member coupled at each end to said frame members behind said fuel tank.

3. A structure for protecting a fuel tank for a motor vehicle according to claim 2 wherein said protective members comprise a metal channel welded to the inside of said frame members and forming a box-like cross-section together with said frame members.

4. A structure for protecting a fuel tank according to claim 2 wherein said reinforcing members comprise metal channels welded to the inside of said frame members in a super imposed position.

5. A structure for protecting a fuel tank according to claim 1 wherein said reinforcing members and a cross-member extending between said frame members is a unitary structure.

6. A structure for protecting a fuel tank for a motor vehicle according to claim 3 wherein said protective members comprise a metal channel welded to the inside of said frame members and forming a box-like cross-section together with said frame members.

7. A structure for protecting a fuel tank according to claim 5 wherein said reinforcing members comprise metal channels welded to the inside of said frame members in a super imposed position.

8. A structure for protecting a fuel tank for a motor vehicle according to claim 1 wherein said protective members comprise a metal channel welded to the inside of said frame members and forming a box-like cross-section together with said frame members.

9. A structure for protecting a fuel tank according to claim 1 wherein said reinforcing members comprise metal channels welded to the inside of said frame members in a super imposed position.

10. A structure for protecting a fuel tank according to claim 1 further comprising a kick-up section of said frame members in front of said gas tank, said kick-up section being reinforced by said reinforcing member.

11. A structure for protecting a fuel tank which is mounted at the rear of the motor vehicle and between two frame members of said motor vehicle which extend along and beyond the sides of said fuel tank, said structure comprising reinforcing members coupled to said frame members, said reinforcing members extending at least the length of said tank whereby said frame members are provided with the reinforcing section adjacent at least the length of said fuel tank and non-reinforcing sections behind said tank and further comprising a kick-up section of said frame members in front of the gas tank, said kick-up section being reinforced by said reinforcing member and an inner channel provided on said frame members forward of said kick-up section, the end of said inner channel only adjoining the end of said reinforcing member at the top of said kick-up section.

12. A protective structure for a fuel tank according to claim 11 wherein the ends of said inner channel and said reinforcing members are fitted together.

* * * * *